(12) United States Patent
Luo et al.

(10) Patent No.: US 10,567,559 B2
(45) Date of Patent: Feb. 18, 2020

(54) SLIDING MECHANISM AND TERMINAL DEVICE PROVIDED WITH SAME

(71) Applicant: Beijing Xiaomi Mobile Software Co., Ltd., Beijing (CN)

(72) Inventors: Tianbiao Luo, Beijing (CN); Zhengquan Wang, Beijing (CN); Yong Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/372,632

(22) Filed: Apr. 2, 2019

(65) Prior Publication Data
US 2019/0306293 A1  Oct. 3, 2019

(30) Foreign Application Priority Data

Apr. 3, 2018 (CN) .......................... 2018 1 0290448

(51) Int. Cl.
*H04M 1/02* (2006.01)
*G06F 1/16* (2006.01)

(52) U.S. Cl.
CPC ........ *H04M 1/0237* (2013.01); *G06F 1/1624* (2013.01); *H04M 2250/14* (2013.01)

(58) Field of Classification Search
CPC ............. H04M 1/0237; H04M 1/0239; H04M 2250/14; G06F 1/1624
See application file for complete search history.

(56) References Cited

U.S. PATENT DOCUMENTS

| | | | |
|---|---|---|---|
| 2005/0122669 A1* | 6/2005 | Lee | H04M 1/0237 361/679.01 |
| 2007/0091555 A1* | 4/2007 | Lee | H04B 1/3833 361/679.02 |
| 2009/0082074 A1 | 3/2009 | Chen | |

(Continued)

FOREIGN PATENT DOCUMENTS

| | | |
|---|---|---|
| CN | 201266961 Y | 7/2009 |
| CN | 102056443 A | 5/2011 |

(Continued)

OTHER PUBLICATIONS

Extended Search Report for European Application No. 19167110.6 from the European Patent Office, dated Jul. 24, 2019.

*Primary Examiner* — Dinh Nguyen
(74) *Attorney, Agent, or Firm* — Finnegan, Henderson, Farabow, Garrett & Dunner, L.L.P.

(57) ABSTRACT

A sliding mechanism applicable in a terminal device includes: a sliding plate and a fixed plate arranged in a stacked way, wherein the sliding plate is provided with a slide rail on both sides in a sliding direction; a guide side of the fixed plate is accommodated in the slide rail, enabling the sliding plate to slide along the fixed plate; the guide side is provided with a guide rail protruding toward the slide rail, and the slide rail is provided with an elastic element, the elastic element sliding along the guide rail and being deformed; a gap is provided between the sliding plate and the fixed plate, and position stopping elements are correspondingly arranged on the fixed plate and at least one of the sliding plate or the slide rail, and configured to stop the sliding plate at a starting point and an ending point of sliding.

15 Claims, 7 Drawing Sheets

(56) References Cited

U.S. PATENT DOCUMENTS

| | | | |
|---|---|---|---|
| 2009/0235590 A1* | 9/2009 | Ho | H04M 1/0237 |
| | | | 49/428 |
| 2010/0234080 A1* | 9/2010 | Holman, IV | H04M 1/0237 |
| | | | 455/575.4 |
| 2011/0170245 A1 | 7/2011 | Wu et al. | |
| 2012/0021809 A1 | 1/2012 | Park et al. | |
| 2012/0222268 A1* | 9/2012 | Yamaguchi | H04M 1/0237 |
| | | | 16/302 |

FOREIGN PATENT DOCUMENTS

| | | |
|---|---|---|
| CN | 202043151 U | 11/2011 |
| CN | 203261374 U | 10/2013 |
| EP | 1 715 661 A2 | 10/2006 |
| EP | 2 257 032 A1 | 12/2010 |
| EP | 2 734 019 A1 | 5/2014 |
| EP | 2 739 017 A1 | 6/2014 |

* cited by examiner

SLIDING MECHANISM AND TERMINAL DEVICE PROVIDED WITH SAME

CROSS REFERENCE

This application is based upon and claims priority to Chinese Patent Application No. 201810290448.X, filed on Apr. 3, 2018 the entire contents thereof are incorporated herein by reference.

TECHNICAL FIELD

The present disclosure relates to the field of intelligent terminal technologies, and more particularly, to a sliding mechanism and a terminal device provided with the same.

BACKGROUND

For a sliding terminal, such as a sliding phone, a sliding mechanism is typically used to slide a front cover with respect to a body of the sliding terminal. Therefore, it is very necessary to provide a sliding mechanism.

In the related art, the sliding mechanism includes: a sliding plate and a fixed plate arranged in a stacked way, the sliding plate connected with the front cover, the fixed plate connected with the body, and a driving spring arranged between the sliding plate and the fixed plate to drive the sliding plate to slide along the fixed plate, so as to drive the front cover to slide along the body. However, the drive spring makes the thickness of the sliding mechanism larger, which in turn affects the compactness design of the sliding terminal.

SUMMARY

In order to overcome the problems in the related art, the present disclosure provides a sliding mechanism and a terminal device provided with the same, and the technical solution is described as follows.

According to an aspect of the present disclosure, there is provided a sliding mechanism applicable in a terminal device. The sliding mechanism includes: a sliding plate and a fixed plate arranged in a stacked way, wherein the sliding plate is provided with a slide rail on both sides in a sliding direction; a guide side of the fixed plate is accommodated in the slide rail, enabling the sliding plate to slide along the fixed plate; the guide side is provided with a guide rail protruding toward the slide rail, and the slide rail is provided with an elastic element, the elastic element sliding along the guide rail and being deformed; and a gap is provided between the sliding plate and the fixed plate, and position stopping elements are correspondingly arranged on the fixed plate and at least one of the sliding plate or the slide rail, and configured to stop the sliding plate at a starting point and an ending point of sliding.

According to another aspect of the present disclosure, there is provided a terminal device provided with any of the above sliding mechanisms.

According to the sliding mechanism provided by the embodiment of the present disclosure, the sliding plate is provided with a slide rail on both sides in a sliding direction; a guide side of the fixed plate is accommodated in the slide rail, enabling the sliding plate to slide along the fixed plate; during the slide process of the sliding plate, position stopping elements are correspondingly arranged on the fixed plate and at least one of the sliding plate or the slide rail, and configured to stop and stabilize the sliding plate at a starting point and an ending point of sliding. By providing a gap between the sliding plate and the fixed plate, it can release the stop of the sliding plate and resume the slide. The guide rail and the elastic element sliding along the guide rail are provided. Since the guide rail protrudes toward the slide rail, and the elastic element has a certain elastic force, the two are matched, deformation occurs when the elastic element slides along the guide rail. The release process of the deformation realizes a semi-automatic slide of the sliding plate. Moreover, the deformation process of the elastic element can form a friction between the guide rail and the elastic element, such that a smooth, comfortable sliding feeling is provided for the sliding plate. The sliding mechanism, provided by the embodiment of the present disclosure, can not only achieve a good sliding function, but also cancels the driving spring between the sliding plate and the fixed plate, so that the overall thickness of the sliding mechanism is reduced without affecting its strength. The thinness can be achieved without affecting its strength.

BRIEF DESCRIPTION OF THE DRAWINGS

In order to more clearly illustrate the technical solutions in the embodiments of the present disclosure, the drawings used in the description of the embodiments will be briefly described below. The accompanying drawings in the following description show merely exemplary embodiments of the present disclosure.

In FIG. 3, in order to facilitate understanding of the installation process of the slide rail on the sliding plate, the slide rail is placed outside of both sides of the sliding plate, which can be understood as an uncombined state.

REFERENCE NUMERALS

1—sliding plate, 101—locating hole, 102—mounting hole, 103—spring tab, 104—stopping hole
2—fixed plate, 201—guide groove, 202—stopping groove, 203—upper convex stopping block
3—slide rail, 301—buffer groove, 302—locating protuberance, 303—position limiting protuberance, 304—lower convex stopping block
4—guide rail 5—elastic element, 501—fixed segment, 502—elastic segment

DETAILED DESCRIPTION

Exemplary embodiments will be described in detail herein, examples of which are illustrated in the accompanying drawings. The following description refers to the same or similar elements in the drawings, unless otherwise indicated. The embodiments described in the following exemplary embodiments do not represent all embodiments consistent with the present disclosure. Instead, they are merely examples of devices consistent with aspects of the present disclosure.

In the related art, the driving spring is arranged between the sliding plate and the fixed plate to make the thickness of the sliding mechanism larger, and this in turn affects the compactness design of the sliding terminal. In order to reduce the thickness of the sliding mechanism, the conventional practice is to simply reduce the thickness of the fixed plate and the sliding plate. This not only makes the thickness reduction effect poor, but also reduces the strength of the sliding mechanism.

Figure 1A:
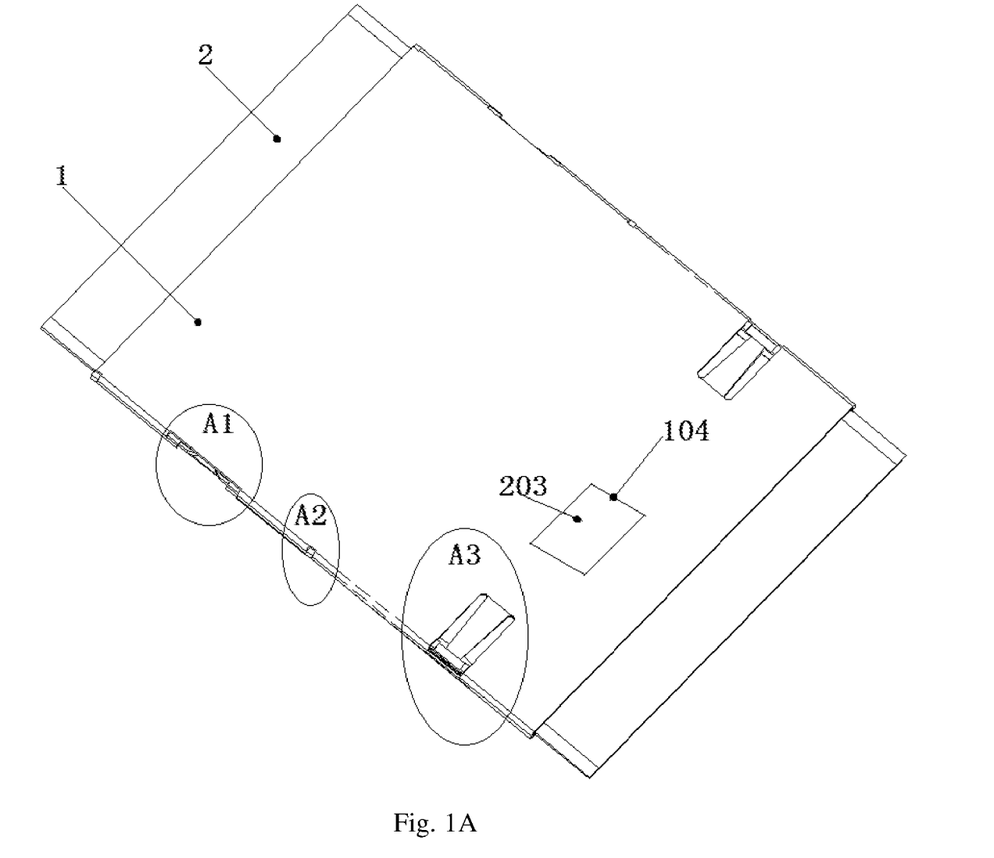
FIG. 1A is a schematic diagram illustrating a sliding mechanism obtained by a first visual angle according to an embodiment of the present disclosure.
Figure 1B:
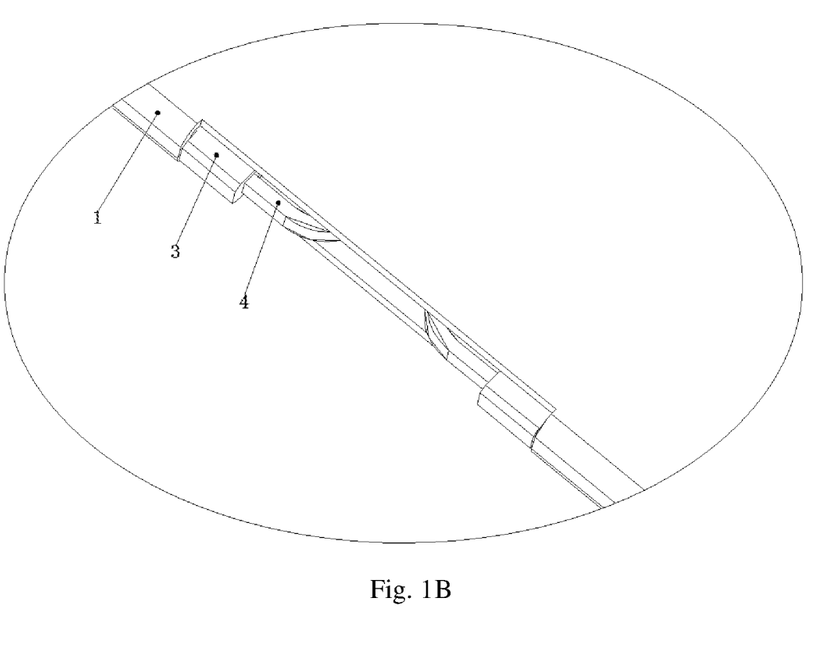
FIG. 1B is an enlarged partial view for illustrating an A1 region of FIG. 1A according to an embodiment of the present disclosure.

In order to overcome above technical problems, in one aspect, an embodiment of the present disclosure provides a sliding mechanism. Referring to FIG. 1A, the sliding mechanism includes: a sliding plate 1 and a fixed plate 2 arranged in a stacked way. Referring to FIG. 1B, FIG. 1D, FIG. 2A and FIG. 2B, the sliding plate 1 is provided with a slide rail 3 on both sides in a sliding direction; a guide side of the fixed plate 2 is accommodated in the slide rail 3, enabling the sliding plate 1 to slide along the fixed plate 2. The guide side of the fixed plate 2 is provided with a guide rail 4 protruding toward the slide rail 3, and the slide rail 3 is provided with an elastic element 5 (see FIG. 2B), the elastic element 5 sliding along the guide rail 4 and being deformed. A gap is provided between the sliding plate 1 and the fixed plate 2, and position stopping elements are correspondingly arranged on the fixed plate 2 and the sliding plate 1 and/or the slide rail 3, and configured to stop the sliding plate 1 at a starting point and an ending point of sliding.

The sliding mechanism, provided by the embodiment of the present disclosure, can slide the sliding plate 1 along the fixed plate 2 by providing with the slide rail 3 on both sides of the slide plate 1 when the guide side of the fixed plate 2 is accommodated in the slide rail 3. During the sliding process of the sliding plate 1, the sliding plate 1 can be stopped by providing with position stopping elements correspondingly arranged on the fixed plate 2 and the sliding plate 1 and/or the slide rail 3, and configured to stop the sliding plate 1 at a starting point and an ending point of sliding. By providing with a gap between the sliding plate 1 and the fixed plate 2, it can release the stop of the sliding plate 1 and resume the slide. The guide rail 4 and the elastic element 5 sliding along the guide rail 4 are provided. Since the guide rail 4 protrudes toward the slide rail 3, and the elastic element 5 has a certain elastic force, the two are matched, deformation occurs when the elastic element 5 slides along the guide rail 4. The release process of the deformation realizes a semi-automatic slide of the sliding plate 1. Moreover, the deformation process of the elastic element 5 can form a friction between the guide rail 4 and the elastic element 5, such that a smooth, comfortable sliding feeling is provided for the sliding plate 1. As described above, the sliding mechanism, provided by the embodiment of the present disclosure, can not only achieve a good sliding function, but also cancels the driving spring between the sliding plate 1 and the fixed plate 2, so that the overall thickness of the sliding mechanism is reduced without affecting its strength. The thinness can be achieved without affecting its strength.

As described above, a gap is provided between the slide plate 1 and the fixed plate 2 in order to release the stop of the sliding plate 1, that is, by pressing the sliding plate 1 or the fixed plate 2, the position stopping elements are changed from the matching stop state to the free state, and the sliding plate 1 is returned to a slidable state. It can be understood that the gap exists in order to allow the slide plate 1 to be easily switched between the stop state and the slidable state without affecting the overall thickness of the sliding mechanism. In the embodiment of the present disclosure, the thickness of the gap may be 0.3 mm to 0.5 mm, for example, 0.4 mm. Correspondingly, the thickness of the sliding plate 1 and the fixed plate 2 may also be 0.3 mm to 0.5 mm, for example, 0.4 mm.

In the embodiment, the sliding direction of the sliding plate 1 can be understood as a front-rear direction. Specifically, when the sliding plate 1 is moved from the starting point of sliding to the ending point of the sliding, it can be considered that it slides from the front to the rear. On the contrary, when the sliding plate 1 is moved from the ending point of sliding to the starting point of sliding, it can be considered that it slides from the rear to the front. Also, the protrusion of the guide rail 4 towards the slide rail 3 can be understood as protruding in a lateral direction.

Figure 2A:
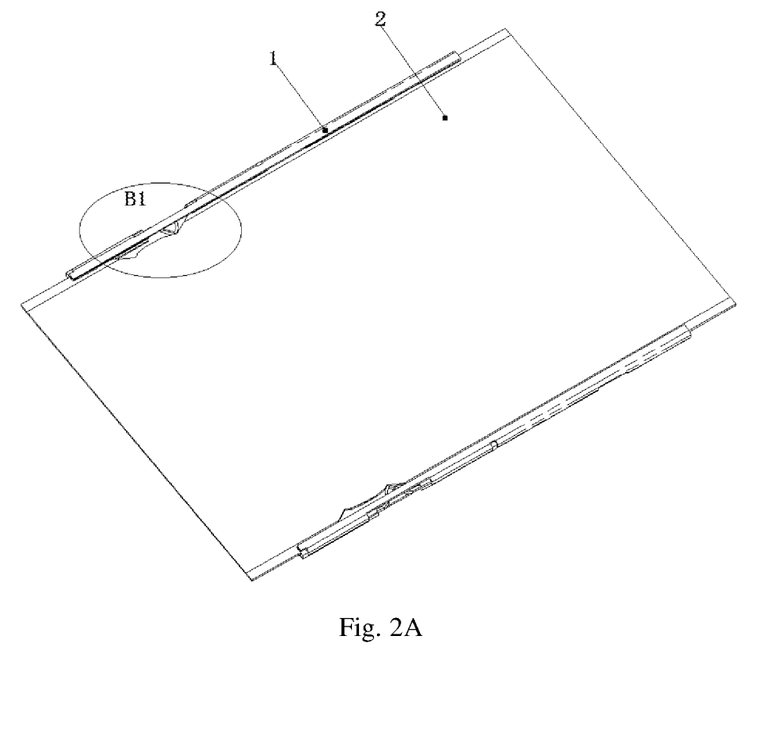
FIG. 2A is a schematic diagram illustrating a sliding mechanism obtained by a second visual angle opposite the first visual angle according to an embodiment of the present disclosure.
Figure 2B:
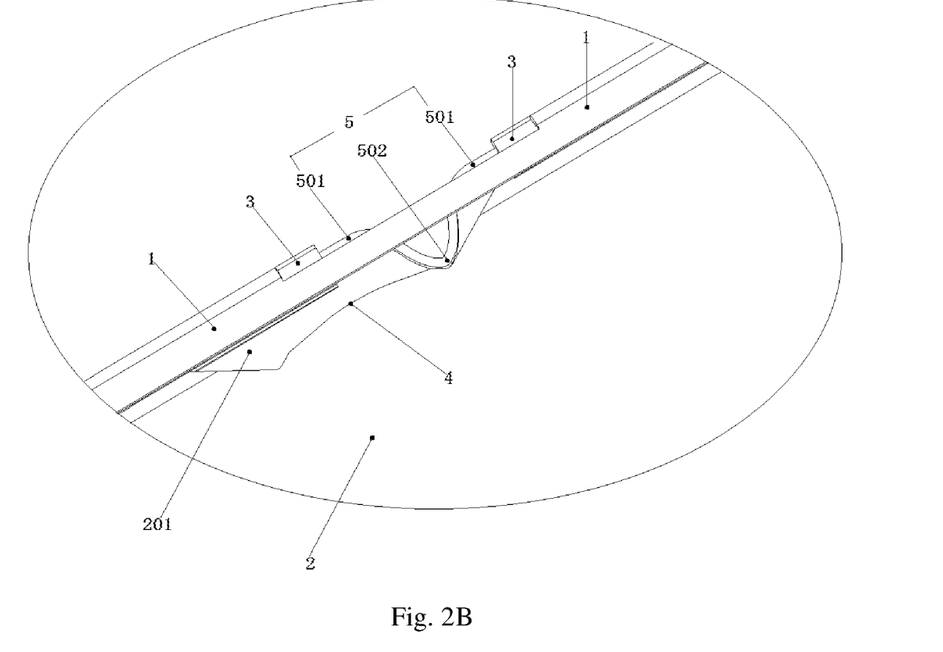
FIG. 2B is an enlarged partial view for illustrating an B1 region of FIG. 2A according to an embodiment of the present disclosure.

The sliding mechanism, provided by the embodiment of the present disclosure, by fitting the guide rail 4 and the elastic element 5 to each other, provides a smooth, comfortable sliding feeling, which is sensible by user's hands, and a semi-automatic slide function for the sliding plate 1. For example, as shown in FIG. 2B, the guide side is provided with the guide groove 201, the bottom of the guide groove 201 serving as the guide rail 4. It can be understood that the bottom of the guide groove 201 is protruding toward the slide rail 3 to provide a guide function for the elastic element 5. Moreover, when the elastic element 5 slides along the bottom of the guide groove 201, i.e., the guide rail 4, both bottoms of the guide groove 201 can be used to limit the elastic element 5, which is advantageous for stopping the sliding plate 1 at the starting point and the ending point of sliding.

In order to make the sliding of the elastic element 5 smoother and more controllable, in the embodiment of the present disclosure, the guide rail 4 has an arc structure. It can be understood that the guide rail 4 can include a front guide section, a redirection section, and a rear guide section which are sequentially formed. The front guide section and the rear guide section are evenly distributed on both sides of the redirection section, and the three smoothly transition to form the guide rail 4 having a symmetrical arc structure.

In an embodiment, when the sliding plate 1 is moved from the starting point of sliding to the ending point of sliding, the elastic element 5 moves from the front to the rear with the sliding plate 1. That is, the elastic element 5 firstly passes through the front guide section by an external force, and the distance between the front guide section and the slide rail 3 is gradually reduced, and at this time, the frictional force between the elastic element 5 and the front guide section is gradually increased. The sliding feeling of the sliding plate 1 is significantly enhanced, and the elastic force is gradually increased. When the elastic element 5 is moved to the redirection section, the friction between the elastic element 5 and the guide rail 4 and its elastic force are maximized. When the elastic element 5 continues to move to the rear guide section, since the distance between the rear guide section and the slide rail 3 is gradually reduced, the elastic force of the elastic element 5 is gradually released and converted into a driving force for driving the sliding plate 1 to move. When the external force is removed, the sliding plate 1 can be automatically slide until it is stopped at the ending point of sliding.

It can be seen that the sliding plate 1 is moved from the starting point of sliding to the ending point of sliding, and the motion of the first half driven by the external force is converted into the automatic movement of the second half to achieve semi-automatic slide. Moreover, as the structure of the guide rail 4 changes, the elastic force of the elastic element 5 gradually changes, and the frictional force between the elastic element 5 and the guide rail 4 also gradually changes, so that the sliding of the sliding plate 1 has a good touch, that is, the sliding feeling, which is favorable for improving the user's usage comfort.

It can be understood that the sliding of the sliding plate 1 from the ending point of sliding to the starting point of sliding is exactly opposite to the sliding process described above, and will not be described herein.

Figure 3:
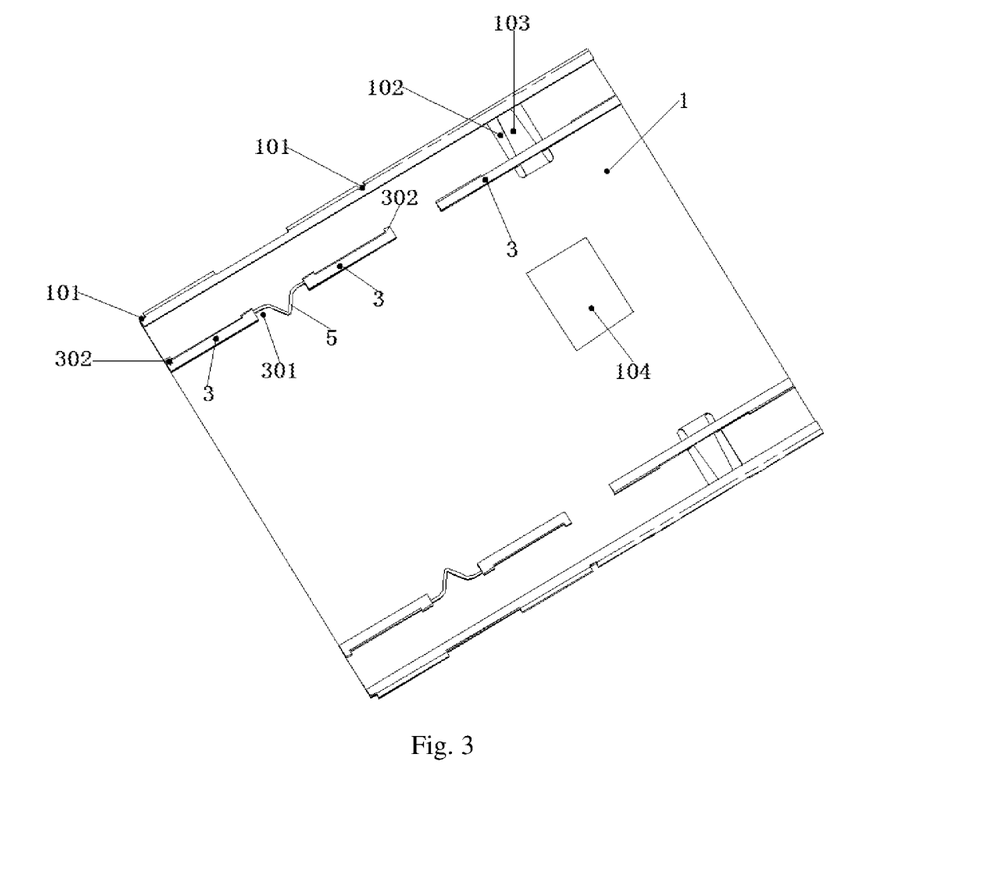
FIG. 3 is a schematic diagram illustrating a connection relationship between a slide rail and a sliding plate obtained by a third visual angle according to an embodiment of the present disclosure.

In order to provide a sufficient buffer space for the elastic element 5 so that it can be elastically deformed according to the structure of the guide rail 4, in the embodiment of the present disclosure, as shown in FIG. 3, the slide rail 3 is provided with a buffer groove 301 accommodating the elastic element 5; as shown in FIG. 2B, the elastic element 5 includes a fixed segment 501 connected to the slide rail 3 and an elastic segment 502 connected to the fixed segment 501; the elastic segment 502 slides along the guide rail 4. The buffer groove 301 is used to provide a buffer space for the elastic deformation of the elastic segment 502. The buffer groove 301 may be a groove structure formed directly on the slide rail 3, or two sections of the slide rails 3 may be provided, and a gap between the two sections of the slide rails 3 may be used as the buffer groove 301.

For the fixed segment 501 of the elastic element 5, it can be fixed to the fixed plate 2 by means of riveting, screwing, etc., and is easy to disassemble while ensuring the fastening of the connection. Alternatively and/or additionally, when the elastic element 5 and the slide rail 3 are of the same material, for example, when both of them are made of metal, they can be connected by welding; when the two both are rigid plastic, they can be integrated by injection molded to achieve the connection.

For the elastic segment 502 of the elastic element 5, it is at least in contact with the guide rail 4 to realize to slide along the guide rail 4. In view of the above, the bottom of the guide groove 201 is used as the guide rail 4, in order to make the elastic segment 502 contact with the guide rail 4, in the embodiment of the present disclosure, the elastic segment 502 is formed in an arc structure, and a convex portion of the elastic segment 502 is in contact with an outer edge of the guide rail 4.

It can be understood that when the elastic segment 502 has an arc structure, the convex portion refers to the top of the arc structure. When applied, the convex portion of the elastic segment 502 having a small area is in point contact with the outer edge of the guide rail 4, which facilitates converting smoothly the structural change of the guide rail 4 to the elastic force change of the elastic element 5, thereby facilitating the semi-automatic slide of the sliding plate 1 and sliding feeling.

In the embodiment of the present disclosure, when the sliding plate 1 is located at the starting point of sliding, the convex portion of the elastic segment 502 can be in contact with the free end of the front guide segment of the guide rail 4. When the sliding plate 1 is located at the ending point of sliding, the convex portion of the elastic segment 502 can be in contact with the free end of the rear guide section of the guide rail 4. Further, in the embodiment of the present disclosure, the length of the fixed plate 2 in the front-rear direction may be greater than the length of the sliding plate 1.

In the embodiment of the present disclosure, the slide rail 3 is detachably fixed to both sides of the sliding plate 1 to facilitate the installation and removal of the slide rail 3. The detachable fixing method can be realized by, e.g., screwing, riveting, engaging, and the like.

As an example, the above fixing may be performed by engaging. For example, the sliding plate 1 is provided with a card slot on both sides, and the slide rail 3 is engaged in the card slot.

Further, the sliding plate 1 includes a sliding body, a vertical baffle vertically connected to both sides of the sliding body, and a horizontal baffle vertically connected to the vertical baffle. The card slot is formed by the sliding body, the vertical baffle, and the horizontal baffle. It will be understood that the open direction of the card slot is inward, which means that the open faces the slide rail 3 and the slide rail 3 is accommodated therein.

It should be noted that, for the sliding plate 1, the sliding body is also provided in the horizontal direction, which is parallel to the horizontal baffles, the sliding body is on the top, and the horizontal baffles are at the bottom. At this time, for one sliding plate 1, it includes a sliding body, two vertical baffles on both sides of the sliding body and two horizontal baffles.

The structure of the sliding plate 1 is not limited to the above, and may be set as follows. The sliding plate 1 includes a sliding body, upper horizontal baffles formed on both sides of the sliding body, vertical baffles formed at the free end of the upper horizontal baffles, lower horizontal baffles formed at the free end of the vertical baffle. At this time, an inwardly facing card slot is formed by the upper horizontal baffle, the vertical baffle, and the lower horizontal baffle. That is, the sliding plate 1 includes a sliding body, two upper horizontal baffles on both sides of the sliding body, two vertical baffles, and two lower horizontal baffles.

In the above, the gap between the two sections of the slide rail 3 can be used as the buffer groove 301 by providing the two sections of the slide rail 3, and in this case, in order to prevent the vertical baffles of the slide plate 1 from affecting the deformation process of the elastic element 5, a through hole may be provided at a corresponding position of the vertical baffles and the buffer groove 301 to expose the elastic element 5, as illustrated in FIG. 2B.

Figure 1C:
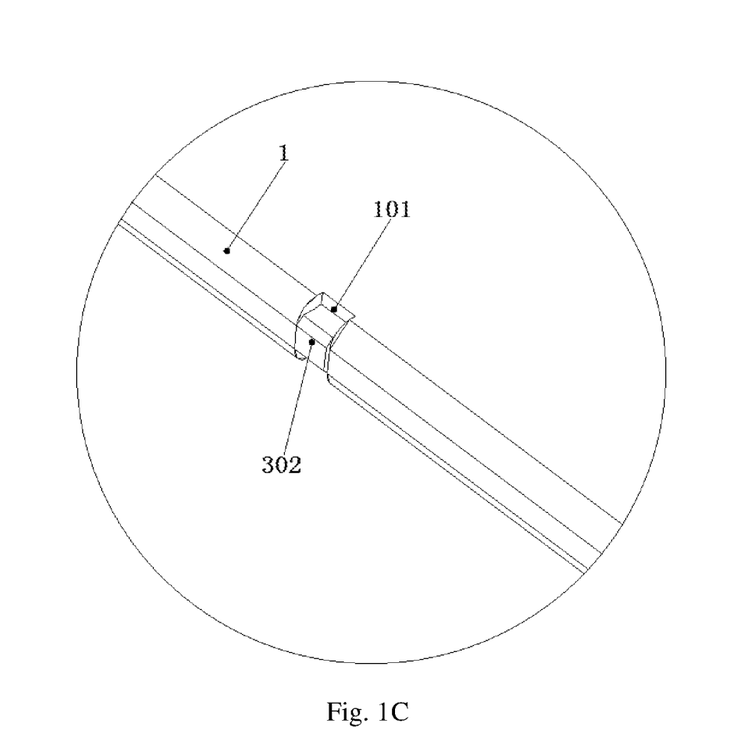
FIG. 1C is an enlarged partial view for illustrating an A2 region of FIG. 1A according to an embodiment of the present disclosure.

In order to improve the mounting tightness of the slide rail 3 in the card slot and prevent unnecessary displacement thereof, in the embodiment of the present disclosure, as shown in FIG. 1C, the vertical baffles of the sliding plate 1 are provided with a locating hole 101. The side wall of the slide rail 3, that is, a vertical baffle of the slide rail 3 is provided with a locating protuberance 302 adaptively engaged with the locating hole 101. During installation, the slide rail 3 is engaged in the card slot, and the locating protuberance 302 thereon is inserted into the locating hole 101 on the sliding plate 1 to achieve positioning. It can be understood that the locating protuberance 302 is inserted into the locating hole 101 in the lateral direction, and the sliding plate 1 slides in the front-rear direction. When the sliding plate 1 slides, by virtue of the blocking function of the locating hole 101, it can be ensured that the locating protuberance 302 is always located in the locating hole 101. The number of the locating holes 101 and the locating protuberance 302 may each be set to one or more.

The locating protuberance 302 may be a square block, a cylindrical block or the like, and the locating hole 101 may be a square hole, a cylindrical hole or the like which is adapted thereto, and the embodiment of the present disclosure does not specifically describe it herein.

Figure 1D:
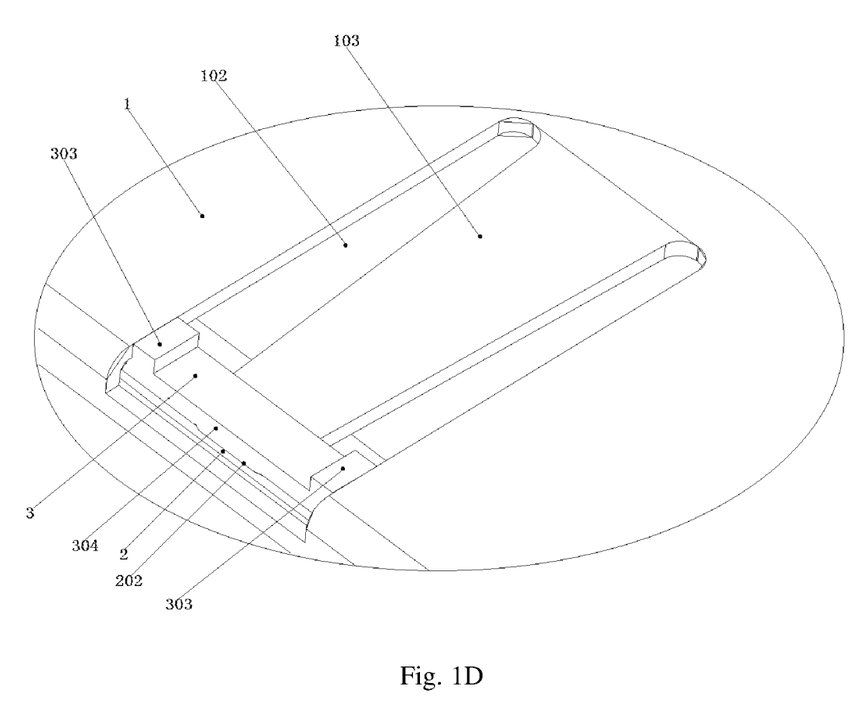
FIG. 1D is an enlarged partial view for illustrating an A3 region of FIG. 1A according to an embodiment of the present disclosure.

Further, as shown in FIG. 1D, the sliding body is provided with a mounting hole 102 and a pressure spring tab 103 located within the mounting hole 102; a side wall of the slide rail 3 is provided with a through hole, and a free end of the pressure spring tab 103 is configured to extend into the through hole and press the fixed plate 2.

By providing the pressure spring tab 103, the free end thereof is inserted into the perforation on the side wall of the slide rail 3, and the two are combined to form a clamping mechanism to press the fixed plate 2, which can ensure the overall thickness of the sliding mechanism is thin, the sliding of the sliding plate 1 is further provided with a good sliding feeling.

In the embodiment of the present disclosure, the length of the perforation in the front-rear direction is greater than the length of the mounting hole 102 to facilitate the installation of the slide rail 3.

The pressure spring tab 103 and the mounting hole 102 can be integrally obtained by cutting and punching the sliding plate 1. The mounting hole 102 may be provided on the sliding plate 1 in advance, and one end of the pressure spring tab 103 is fixed by welding in the mounting hole 102.

For example, the mounting hole 102 may be provided as a square opening, one end of which extends to be connected with the card slot. The pressure spring tab 103 may be provided in a trapezoidal sheet shape whose width gradually decreases toward the direction of the card slot, and one end thereof is connected to the end portion of the mounting hole 102, and the other end is inserted as a free end into the through hole in the side wall of the slide rail 3.

In order to achieve further limitation on the slide rail 3, as shown in FIG. 1D, a top wall of the slide rail 3 is provided with two position limiting protuberances 303, the two position limiting protuberances 303 abut against two side walls of the mounting hole 102, respectively. By the position limiting protuberance 303 abutting against the mounting hole 102, the position limitation of the slide rail 3 is realized, and the displacement thereof is prevented in the front-rear direction. Moreover, the above structure also facilitates the installation of the slide rail 3. It can be understood that the position limiting protuberance 303 is an upper convex structure.

As described above, the fixed plate 2 and the sliding plate 1 and/or the slide rail 3 are provided with fitting stopping elements for stopping the sliding plate 1 at the starting point and the ending point of sliding. Based on the above limitation of the structure of the slide rail 3 and the sliding plate 1, stopping elements as described below can be provided.

Referring to FIG. 1D, a top wall of the through hole is provided with a lower convex stopping block 304; a surface of the fixed plate 2 is provided with a stopping groove 202 matched with the lower convex stopping block 304; and the lower convex stopping block 304 is matched with the stopping groove 202 to form a first stopping element.

When the sliding plate 1 needs to be stopped, the sliding plate 1 is moved to the lower convex stopping block 304 and enters the inside of the stopping groove 202, and the sliding plate 1 can achieve a stable stop based on the pressing function of the spring tab 103. When the stop position needs to be released, the fixed plate 2 is pressed down by pressing the spring tab, so that the lower convex stopping block 304 is disengaged from the inside of the stopping groove 202, and the sliding plate 1 is recovered to the free sliding state.

As described above, the top wall of the through hole is provided with a lower convex stopping block 304. To facilitate understanding of the position of the lower convex stopping block 304, the following description is combined with the structure of the slide rail 3.

In the embodiment of the present disclosure, the structure of the slide rail 3 may include the upper horizontal plate, the vertical plate, and the lower horizontal plate, which are sequentially connected vertically. The structure of the card slot is adapted to the structure of the slide rail 3 so that the slide rail 3 is just accommodated and engaged therein. Based on the presence of the spring tab 103, a hole, i.e., perforation, is provided in the side walls i.e., vertical plate, of the slide rail 3 to facilitate the pass of the spring tab 103 and the mounting of the slide rail 3 on the sliding plate 1. The perforation can be understood as a rectangular opening, which includes a top wall, a bottom wall and left and right side walls. By providing a lower convex stopping block 304 on the top wall of the perforation (which can also be considered to make the top wall of the perforation convex downward), a stopping structure can be formed by fitting the stopping groove 202 on the surface of the fixed plate 2 in the slide rail 3.

It can be understood that two stopping grooves 202 may be provided on the surface of the fixed plate 2, respectively corresponding to the starting position and the ending position of sliding of the sliding plate 1, so as to facilitate the sliding plates 1 to be respectively located at the starting position and the ending position of sliding.

The above description has been made on the first stopping member on the fixed plate 2 and the slide rail 3. Further, it can provide a second stopping member on the fixed plate 2 and the sliding plate 1. For example, as shown in FIG. 1A, the sliding plate 1 is provided with a stopping hole 104; a surface of the fixed plate 2 is provided with an upper convex stopping block 203 matched with the stopping hole 104; and the upper convex stopping block 203 is matched with the stopping hole 104 to form a second stopping element.

When the sliding plate 1 needs to be stopped, the stopping hole 104 on which the sliding plate 1 is moved can be engaged with the upper convex stopping block 203. When the stop position needs to be released, the upper convex stopping block 203 is pressed to be disengaged from the inside of the stopping hole 104, and the sliding plate 1 can be recovered to the free sliding state.

It can be understood that the second stopping element can stop the sliding plate 1 at the starting point of sliding, to match the first stopping element to improve the stability of the sliding plate 1 at the starting position of sliding.

In order to ensure the strength of the slide rail 3 and prevent its deformation, in the embodiment of the present disclosure, as shown in FIG. 3, the slide rail 3 includes a front section and a rear section distributed from front to back at an interval. By arranging the slide rail 3 in two sections, the strength and structural stability of the slide rail 3 can be significantly enhanced compared to the one section structure.

When the slide rail 3 includes the front section and the rear section, the elastic element 5 may be provided in the front section (in this case, the front section may be further divided into two sections to form a gap as the buffer groove 301), and the locating protuberance 302 may be provided at both ends of the front section. The locating hole 101 is provided on the side wall of the sliding plate 1 corresponding thereto to realize the location and mounting of the front section. A perforation may be provided on the rear section, and a lower convex stopping block 304 is provided on the top wall of the perforation, and a stopping groove 202 is provided on the surface of the corresponding fixed plate 2 to realize the location and mounting of the rear section. It can be understood that the free end of the spring tab 103 enters the perforation of the rear section to press the fixed plate 2.

In order to prevent the sliding plate 1 from generating noise during the sliding process, and in order to further improve the sliding feeling of the sliding plate 1, in the embodiment of the present disclosure, the material of the slide rail 3 and the elastic element 5 are both rigid plastics. For example, the rigid plastic may be polyformaldehyde (POM), polyvinyl chloride (PVC) or the like. When the slide rail 3 is made by using a rigid plastic, it can be integrally injection molded.

In addition, since the fixed plate 2 is made of a metal material, the guide rail 4 on the guide side is also made of a metal material. In this case, if the rigid plastic material is used for the elastic element 5, when it slides along the guide rail 4, noise can be avoided, and also excessive wear of the metal material of the guide rail 4 can be prevented, ensuring that the sliding resistance is not increased.

Further, the slide rail 3 and the elastic element 5 are integrally injection molded. Not only the preparation process is simplified but also controllability of the dimensions of the elastic element 5 and the slide rail 3 is facilitated.

It can be understood that, in the embodiment of the present disclosure, the materials of the sliding plate 1 and the fixed plate 2 may be metal, such as steel, aluminum alloy, or the like.

According to another aspect of the present disclosure, there is provided a terminal device, provided with any of the above sliding mechanisms.

In application, the body of the terminal device can be fixed on the fixed plate 2, and the sliding cover of the terminal device is fixed on the sliding plate 1 to slide the sliding cover in relation to the body.

For example, the terminal device includes a mobile phone or a tablet computer.

Other embodiments of the present disclosure will be apparent to those skilled in the art from consideration of the specification and practice of the present disclosure disclosed here. The present disclosure is intended to cover any variations, uses, or adaptations of the present disclosure following the general principles thereof and including such departures from the present disclosure as come within prior art. It is intended that the specification and embodiments be considered as exemplary only, with a scope of the present disclosure being indicated by the following claims.

It will be appreciated that the present disclosure is not limited to the exact construction that has been described above and illustrated in the accompanying drawings, and that various modifications and changes can be made without departing from the scope thereof. The scope of the present disclosure is only restricted by the appended claims.

What is claimed is:

1. A sliding mechanism, applied in a terminal device, comprising:
a sliding plate and a fixed plate arranged in a stacked way, wherein the sliding plate is provided with a slide rail on both sides in a sliding direction, and the slide rail is detachably fixed to both sides of the sliding plate;
a guide side of the fixed plate is accommodated in the slide rail, enabling the sliding plate to slide along the fixed plate;
the guide side is provided with a guide rail protruding toward the slide rail, and the slide rail is provided with an elastic element, the elastic element sliding along the guide rail and being deformed; and
a gap is provided between the sliding plate and the fixed plate, and position stopping elements are correspondingly arranged on the fixed plate and at least one of the sliding plate or the slide rail, and configured to stop the sliding plate at a starting point and an ending point of sliding,
wherein:
the sliding plate comprises a sliding body, a vertical baffle vertically connected to both sides of the sliding body, and a horizontal baffle vertically connected to the vertical baffle,
the sliding plate is provided with a card slot on both sides, the card slot is formed by the sliding body, the vertical baffle, and the horizontal baffle, and the slide rail is engaged in the card slot.

2. The sliding mechanism of claim 1, wherein the guide side is provided with a guide groove, a bottom of the guide groove serving as the guide rail.

3. The sliding mechanism of claim 2, wherein the guide rail has an arc structure.

4. The sliding mechanism of claim 1, wherein the slide rail is provided with a buffer groove accommodating the elastic element; and
the elastic element comprises a fixed segment connected to the slide rail, and an elastic segment connected to the fixed segment, the elastic segment sliding along the guide rail.

5. The sliding mechanism of claim 4, wherein the elastic segment is formed in an arc structure, and a convex portion of the elastic segment is in contact with an outer edge of the guide rail.

6. The sliding mechanism of claim 1, wherein the vertical baffle is provided with a locating hole, and a side wall of the slide rail is provided with a locating protuberance adaptively engaged with the locating hole.

7. The sliding mechanism of claim 1, wherein the sliding body is provided with a mounting hole and a pressure spring tab located within the mounting hole;
a side wall of the slide rail is provided with a through hole, and a free end of the pressure spring tab is configured to extend into the through hole and press the fixed plate.

8. The sliding mechanism of claim 7, wherein a top wall of the slide rail is provided with two position limiting protuberances, the two position limiting protuberances abutting against two side walls of the mounting hole, respectively.

9. The sliding mechanism of claim 7, wherein a top wall of the through hole is provided with a lower convex stopping block;
a surface of the fixed plate is provided with a stopping groove matched with the lower convex stopping block; and
the lower convex stopping block is matched with the stopping groove to form a first stopping element.

10. The sliding mechanism of claim 1, wherein the sliding plate is provided with a stopping hole;
a surface of the fixed plate is provided with an upper convex stopping block matched with the stopping hole; and the upper convex stopping block is matched with the stopping hole to form a second stopping element.

11. The sliding mechanism of claim 1, wherein the slide rail comprises a front section and a rear section distributed from front to back at an interval.

12. The sliding mechanism of claim 1, wherein the slide rail and the elastic element are made from rigid plastic.

13. The sliding mechanism of claim 12, wherein the slide rail and the elastic element are integrally injection molded.

14. A terminal device, provided with a sliding mechanism, the sliding mechanism comprising: a sliding plate and a fixed plate arranged in a stacked way, wherein:

the sliding plate is provided with a slide rail on both sides in a sliding direction, and the slide rail is detachably fixed to both sides of the sliding plate;

a guide side of the fixed plate is accommodated in the slide rail, enabling the sliding plate to slide along the fixed plate;

the guide side is provided with a guide rail protruding toward the slide rail, and the slide rail is provided with an elastic element, the elastic element sliding along the guide rail and being deformed;

a gap is provided between the sliding plate and the fixed plate, and position stopping elements are correspondingly arranged on the fixed plate and at least one of the sliding plate or the slide rail, and configured to stop the sliding plate at a starting point and an ending point of sliding;

the sliding plate comprises a sliding body, a vertical baffle vertically connected to both sides of the sliding body, and a horizontal baffle vertically connected to the vertical baffle; and the sliding plate is provided with a card slot on both sides, the card slot is formed by the sliding body, the vertical baffle, and the horizontal baffle, and the slide rail is engaged in the card slot.

15. The terminal device of claim 14, being a mobile phone or a tablet computer.

\* \* \* \* \*